US008373107B2

(12) United States Patent
Meyers et al.

(10) Patent No.: US 8,373,107 B2
(45) Date of Patent: Feb. 12, 2013

(54) METHOD AND APPARATUS FOR NON-LINE-OF-SIGHT IMAGING OF A FIRST AREA USING PHOTONS DETECTED FROM A SECOND AREA

(75) Inventors: Ronald Everett Meyers, Columbia, MD (US); Keith Scott Deacon, Coumbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/198,133

(22) Filed: Aug. 4, 2011

(65) Prior Publication Data

US 2011/0284724 A1    Nov. 24, 2011

Related U.S. Application Data

(63) Continuation-in-part of application No. 12/819,602, filed on Jun. 21, 2010, now Pat. No. 8,242,428, which is a continuation-in-part of application No. 12/330,401, filed on Dec. 8, 2008, now Pat. No. 7,812,303, and a continuation-in-part of application (Continued)

(51) Int. Cl.
*H01L 27/00* (2006.01)
(52) U.S. Cl. ..................... 250/208.1; 250/221
(58) Field of Classification Search ............... 250/208.1, 250/203.3–203.6, 221; 356/4.01, 141.1, 356/146, 147; 382/106–123, 190–216, 274–278
See application file for complete search history.

(56) References Cited

U.S. PATENT DOCUMENTS 5,796,477 A * 8/1998 Teich et al. .................. 356/318

OTHER PUBLICATIONS

R. Meyers, K. Deacon, and Y. Shih, 'Ghost-imaging experiment by measuring reflected photons,' Phys. Rev. A 77, 041801(R) (2008).
D. L. Donoho, "Compressed sensing," IEEE Transactions on Information Theory, vol. 52, pp. 1289-1306, 2006.
E. Candes, J. Romberg, and T. Tao, "Robust uncertainty principles: Exact signal Reconstruction from Highly Incomplete Frequency Information," IEEE Trans. Inf. Theory, 52, 489 (2006).
Giuliano Scarcelli, et al. "Can Two-Photon Correlation of Chaotic Light Be Considered as Correlation of Intensity Fluctuations?" Physics Review Letters 96, 063602 (2006).
O. Katz, Y. Bromberg, Y. Silberberg, "Compressive Ghost Imaging," Appl Phys. Lett., 95, 131110 (2009).
J. Shapiro, "Computational ghost imaging," Phys. Rev. A vol. 78 061802(R) (Dec. 18, 2008).
R. Meyers and K. Deacon,"Quantum Ghost Imaging Experiments At ARL", Proc. SPIE vol. 7815, 78150I, (2010).

(Continued)

*Primary Examiner* — Que T Le
(74) *Attorney, Agent, or Firm* — Lawrence E. Anderson

(57) ABSTRACT

A system for imaging information comprising a spatial receiver, a chaotic photon light source comprising a first beam directed at a first predetermined area containing an object, and a second beam received by the spatial receiver and measured at specific intervals in time; the spatial receiver transmitting spatial information correlated to specific intervals of time to a processor; and a first receiver detecting the influence of the object on the first light beam; the first receiver not being in the line of sight with the first predetermined area and adapted to detect light from a second predetermined area spaced from the first predetermined area, the at least one processor operating to correlate the outputs of the first receiver with spatial information derived from the spatial receiver at correlating intervals of time to create an image of the object and a method for practicing the invention.

19 Claims, 13 Drawing Sheets

Related U.S. Application Data

No. 12/343,384, filed on Dec. 23, 2008, now Pat. No. 7,847,234, which is a continuation-in-part of application No. 10/900,351, filed on Jul. 28, 2004, now Pat. No. 7,536,012.

(60) Provisional application No. 60/993,792, filed on Dec. 6, 2007, provisional application No. 60/493,107, filed on Aug. 6, 2003.

(56) References Cited

OTHER PUBLICATIONS

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih,"A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shih, "Turbulence-free ghost imaging," Appl. Phys. Lett. 98, 111115 (Mar. 18, 2011); doi:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement,"Phys. Rev. A 52, R3429-R3432 (1995).

D. Strekalov, et al. "Observation of Two-Photon 'Ghost' Interference and Diffraction,"Phys. Rev. Lett. 74, 3600-3603 (1995).

Jensen, Hendrik, et al. "A Practical Model for Subsurface Light Transport," Proceedings of SIGGRAPH'2001 conference proceedings,http://graphics.stanford.edu/papers/bssrdf/.

R.E. Meyers, K.S. Deacon, "Turbulence Free Ghost Imaging: Experiments and Results," PQE 2011, Invited Presentation (2011) (Jan. 4, 2011) Abstract.

Liu, et al."Quantum reflection of vortices in Bose-Einstein condensates" Physical Review A 74, 043619 (2006).

Fuchs, C., "Acquisition of Subsurface Scattering Objects" Diploma Thesis, www.uni-ulm.de/fileadmin/website_uni.../Fuchs-2004-ASO.pdf Max-Planck-Institut für Informatik. Saarbrücken, Germany (2006).

\* cited by examiner

FIG. 1 Graphical depiction of "Classical Imaging" (PRIOR ART)

EPR= Source derived from Einstein–Podolsky–Rosen paradox

FIG. 2 KLYSHKO DIAGRAM FOR TYPE-I GHOST IMAGING

FIG. 3 KLYSHKO DIAGRAM FOR TYPE-II GHOST IMAGING

Klyshko Diagram of the near-field lensless Type-II ghost imaging.

FIG.4 PRIOR ART - PITTMAN, et al. OPTICAL DEVICE

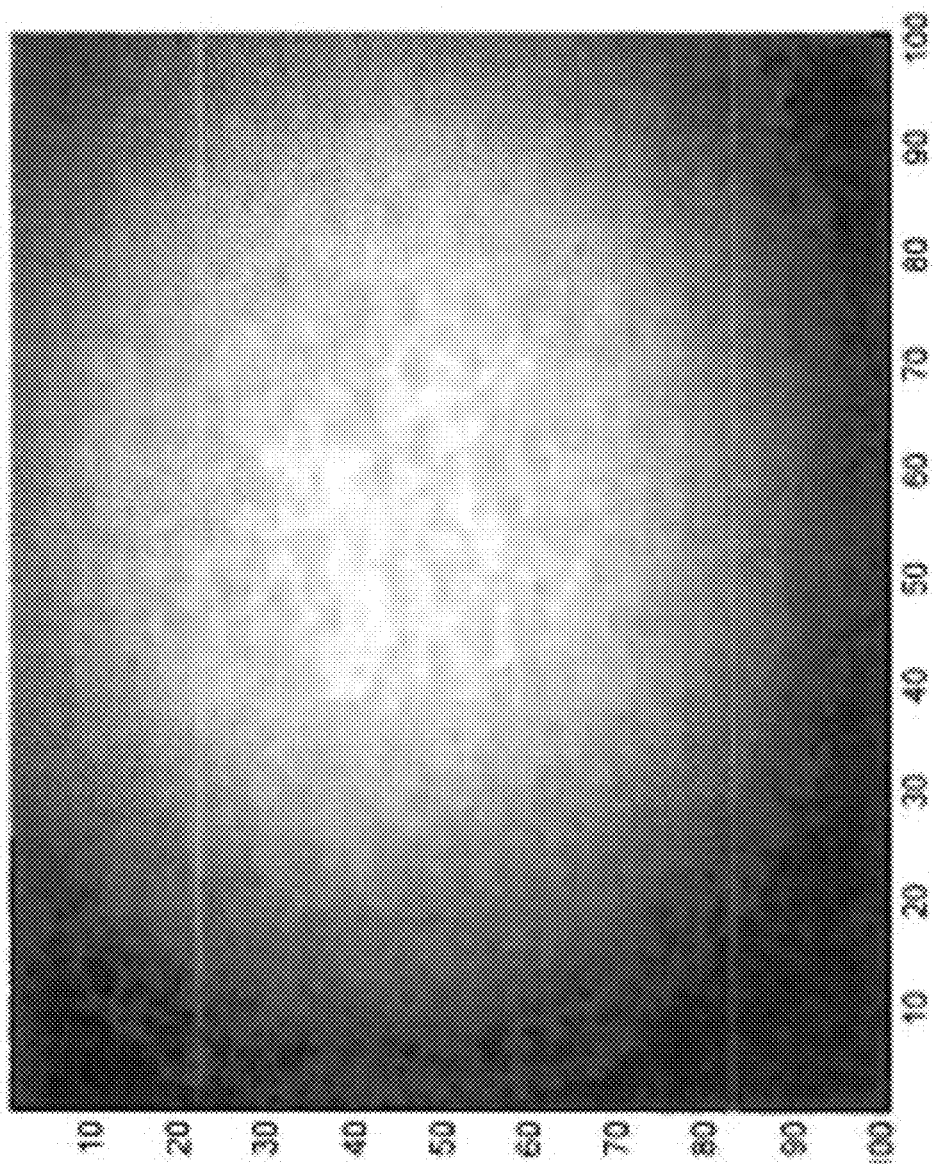
FIG. 13 ENSEMBLE INTEGRATION OF ALL THE REFERENCE FIELD MEASUREMENTS FOR 10,000 FRAMES

METHOD AND APPARATUS FOR NON-LINE-OF-SIGHT IMAGING OF A FIRST AREA USING PHOTONS DETECTED FROM A SECOND AREA

CROSS-REFERENCE TO RELATED APPLICATIONS

This application claims priority of U.S. patent application Ser. No. 12/819,602 entitled "Method and System for LIDAR Utilizing Quantum Properties," filed Jun. 21, 2010 which in turn claim priority of application Ser. No. 12/330,401 (U.S. Pat. No. 7,812,303) entitled "Method and System for Creating an Image Using Quantum Properties of Light Based Upon Spatial Information From a Second Light Beam Which Does not Illuminate the Subject," filed Dec. 8, 2008, which claims priority to U.S. Provisional Patent Application Ser. No. 60/993,792 filed Dec. 6, 2007. This application claims priority to U.S. patent application Ser. No. 12/837,668 entitled "Method and System for Creating an Image Using The Quantum Properties of Sound or Quantum Particles," filed Jul. 16, 2010, which is a divisional application of U.S. Pat. No. 7,812,303, all of which are incorporated by reference herein. The present application and U.S. patent application Ser. No. 12/819,602 also claim priority of U.S. patent application Ser. No. 12/343,384 filed Dec. 23, 2008, entitled "Method and System for Quantum Imaging Using Entangled Photons Pairs," now U.S. Pat. No. 7,847,234, issued Dec. 7, 2010, and U.S. patent application Ser. No. 10/900,351, filed on Jul. 28, 2004, now U.S. Pat. No. 7,536,012, which in turn claims priority to U.S. Provisional Application No. 60/493,107, filed Aug. 6, 2003, all of which are incorporated herein by reference.

GOVERNMENT INTEREST

The invention described herein may be manufactured, used, and/or licensed by or for the United States Government.

BACKGROUND OF THE INVENTION

One surprising consequence of quantum mechanics is the nonlocal correlation of a multi-particle system measured by joint-detection of distant particle detectors. In two publications by R. Meyers, K. S. Deacon, Y. H. Shih, entitled "Ghost Imaging Experiment by Measuring Reflected Photons," Phys. Rev. A, Rapid Comm., Vol. 77, 041801 (R) (2008) and "A new Two-photon Ghost Imaging Experiment with Distortion Study," J. Mod. Opt., 54: 16, 2381-2392 (2007), both of which are hereby incorporated by reference, "ghost imaging" of remote objects by measuring reflected photons is reported.

"Ghost imaging" is a technique that allows a camera or image capture device to produce an image of an object which the camera or device does not directly receive; hence the terminology "ghost." Early demonstrations of ghost imaging were based on the quantum nature of light; using quantum correlations between photon pairs to build an image of the unseen object. Generally speaking, "ghost imaging" comprises the characteristics of nonlocal multiphoton interference and imaging resolution that differs from that of classical imaging. Using correlated photons from photon pairs, a camera constructs an image using recorded pixels from photons that hit simultaneously at the object and the camera's image plane.

Two types of "ghost imaging" has been used experimentally since 1995; Type I uses entangled photon pairs as the light source and Type II uses a chaotic thermal light. Klyshko diagrams are shown for Type I and II sources are shown in FIGS. 2 and 3 respectfully.

Conventional line-of-sight imaging (graphically depicted in FIG. 1) lacks the ability to image target objects hidden by obstacles such as terrain, vegetation, buildings, and caves that place limitations on sensor positioning and field of view. Experiments have been performed proving that Ghost Imaging has abilities beyond those of classical imaging; including imaging through obscurants and turbulence.

FIG. 4 is a schematic diagram of an experimental optical device by Pittman, et al., as described in Pittman, et al. "Optical Imaging by Means of Two-photon Quantum Entanglement: Physical Review A, Vol. 52, No. 5, November 1995, hereby incorporated by reference, and hereinafter referred to as Pittman, et al. As described in Pittman, et al., signal and idler beams emerging from the SPDC crystal are sent in different directions so that coincidence detections may be performed between two distant photon counting detectors. An aperture placed in front of one of the detectors, for example, the letters UMBC, is illuminated by the signal beam through a convex lens. By placing the other detector at a distance prescribed by a "two-photon Gaussian thin lens equation" and scanning it in the transverse plane of the idler beam, a sharp magnified image of this aperture is observed in the coincidence counting rate, even though both detector's single counting rates remain constant.

The Pittman, et al. experimental setup is shown in FIG. 4. In the experiment a 2-mm-diameter beam from the 351.1-nm line of an argon ion laser is used to pump a nonlinear beta barium borate (BBO) ($\beta$-BaB$_2$O$_4$) crystal that is cut at a degenerate type-II phase-matching angle to produce pairs of orthogonally polarized signal (e-ray plane of the BBO) and idler (o-ray plane of the BBO) photons. The pairs emerge from the crystal nearly collinearly, with $\omega_s=\omega_i=\omega_{p/2}$. The pump is then separated from the slowly expanding down-conversion beam by a UV grade fused silica dispersion prism and the remaining signal and idler beams are sent in different directions by a polarization beam-splitting Thompson prism. The reflected signal beam passes through a convex lens with a 400-mm focal length and illuminates the (UMBC) aperture. Behind the aperture is the detector package D$_1$, which consists of a 25-mm focal length collection lens in whose focal spot is a 0.8-mm-diam dry ice cooled avalanche photodiode. The transmitted idler beam is met by detector package D$_2$, which consists of a 0.5-mm-diameter multimode fiber whose output is mated with another dry ice cooled avalanche photodiode. Both detectors are preceded by 83-nm-bandwidth spectral filters centered at the degenerate wavelength 702.2 nm. The input tip of the fiber is scanned in the transverse plane by two orthogonal encoder drivers, and the output pulses of each detector, which are operating in the Geiger mode, are sent to a coincidence counting circuit with a 1.8-ns acceptance window. By recording the coincident counts as a function of the fiber tip's transverse plane coordinate, an image of the UMBC aperture is seen as described further in Pittman, et al. The aperture containing the UMBC that was inserted in the signal beam (about 3.5×7 mm) is shown in the upper right, and the observed image (reportedly measured 7×14 mm) is shown beneath the aperture. Pittman, et al. demonstrated the viability of ghost imaging, it did not provide a viable solution for non-line-of-sight imaging, Current Ghost Imaging methods are based on having the object being imaged in the line-of-sight or field of view of the bucket detector.

SUMMARY OF PRESENT INVENTION

The present invention is directed to obtaining an image of an object that is not in the direct line of sight or field of view of the viewer, which may be for example, a bucket detector.

When a photon detector is aimed nearby the object but not at the object then a Ghost Image of part or the entirety of the object is generated. The photon detector detects photons from a first area which have been scattered by a process such as multiple scattering into a second area such that the detector measures photons while aimed at the second area. In addition, photons from the target area may scatter and induce fluorescence in the second area such that a ghost image can also be formed from the fluorescent photons.

A preferred embodiment of the present invention enables imaging of an object or subject area when without the object or subject area being in the field of view of the bucket detector. This creates the possibility of imaging around corners; imaging of concealed objects, imaging of objects not in the line-of-sight to the detector, remote sensing, microscopic sensing, spectroscopy, identification of hidden or concealed objects, remote biometrics, design of new sensors and image processing methods, design of new types of stealth technology, design of new types of communications devices.

The present invention demonstrates the ability to obtain an image of an object using a detector that is not in the direct line of sight or field of view of the image. By aiming a detector at a point nearby the object but not at the object then an image of part or the entirety of the object is generated. Thus, an image of object may be generated even in the presence of turbulence which might otherwise be disruptive to image generation or when a direct view of the object is not possible.

Scattering of quantum particles such as photons off an object carries information of the object shape even when the quantum particles such as photons of light do not go directly to the receiver/detector, but may in turn be rescattered. The receiver/detector picks up quantum information on the object shape and its temporal relations to separately reference fields. The reference fields are recorded by an imager (CCD, digital cameras, video cameras, scanner, or camera, etc.) that looks at the light source but not the object. This technique may be utilized even when the detector was aimed at a region to the side of the object that was coplanar with the object. Experiments performed determined that Ghost Imaging has abilities beyond those of classical imaging, including imaging through obscurants and turbulence. Experiments have confirmed the potential to generate ghost images of objects when the "bucket" detector used in ghost imaging is significantly occluded.

A preferred method comprises obtaining an image of an object out of line of sight comprising directing a chaotic light beam at a first area containing the object; measuring the light from the chaotic light beam at a plurality of instances in time; using a photon detector, detecting light from a second area over a plurality of instances in time; the photon detector not being in the line of sight with the first area but in line-of-sight with a second area; using a processor, correlating the information received by the photon detector with the measurement of light from the chaotic light beam at specific instances in time; and producing an image of the object.

A preferred embodiment comprises a system for imaging information comprising a spatial receiver, a chaotic photon light source for producing light; the light comprising a first beam adapted to be directed at a first predetermined area containing an object, and a second beam which is received by the spatial receiver and measured at specific intervals in time; at least one processor operatively connected to the spatial receiver, the spatial receiver operating to transmit spatial information correlated to specific intervals of time to the processor; a first receiver operatively connected to the at least one processor and operative to detect the influence of the object on the first portion of the light beam; the first receiver not being in the line of sight with the first predetermined area and adapted to detect light from a second predetermined area spaced from and coplanar with the first predetermined area, and the at least one processor operating to correlate the outputs of the first receiver with spatial information derived from the spatial receiver at correlating intervals of time to create an image of the object.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIGS. 6A through 6F are a set of images depicting the results of a reflection ghost imaging experiment wherein the light path to the bucket detector passes through an obscuring medium (FIGS. 6A-6C) and where it does not (FIGS. 6D-6F). In this example the location of the obscuring medium is in the vicinity of position 15 of FIG. 5A.

FIG. 6B is an averaged image of the light source 12 obtained from detector 22 on averaging of 100 such images according to FIG. 6A.

FIG. 6C is a $G^{(2)}$ image of the object obtained by correlation to photon ghost imaging from signals 17 and 23 of FIG. 5A.

FIG. 6D is an instantaneous image of the light source; object reflection.

FIG. 6E is an averaged image of the source.

FIG. 6F is the $G^{(2)}$ image of object reflection.

FIG. 13 is an illustration of result of ensemble integration of all the reference field measurements for 10,000 frames.

Figure 1:
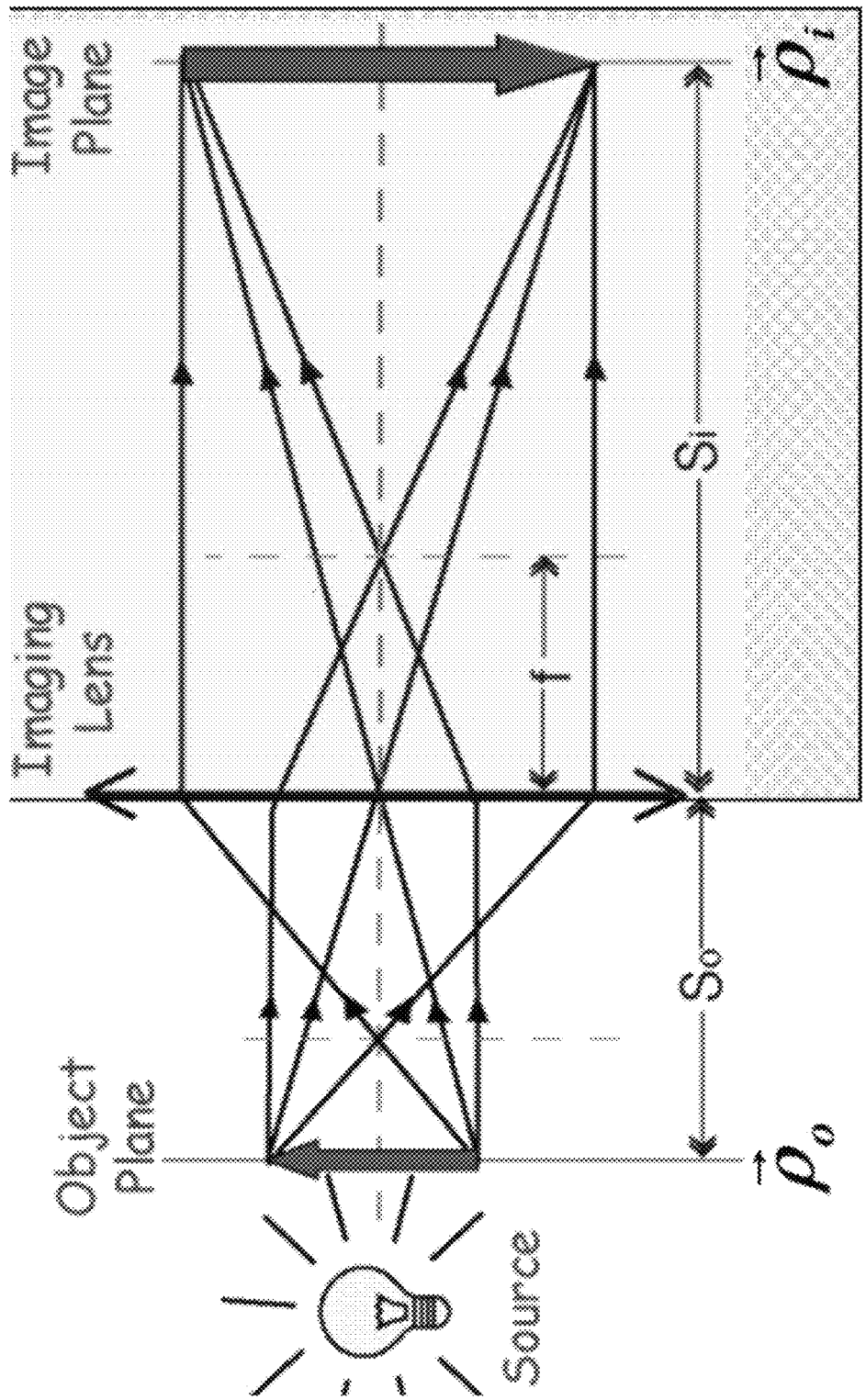
FIG. 1 is a graphical illustration of "Classical Imaging."
Figure 2:
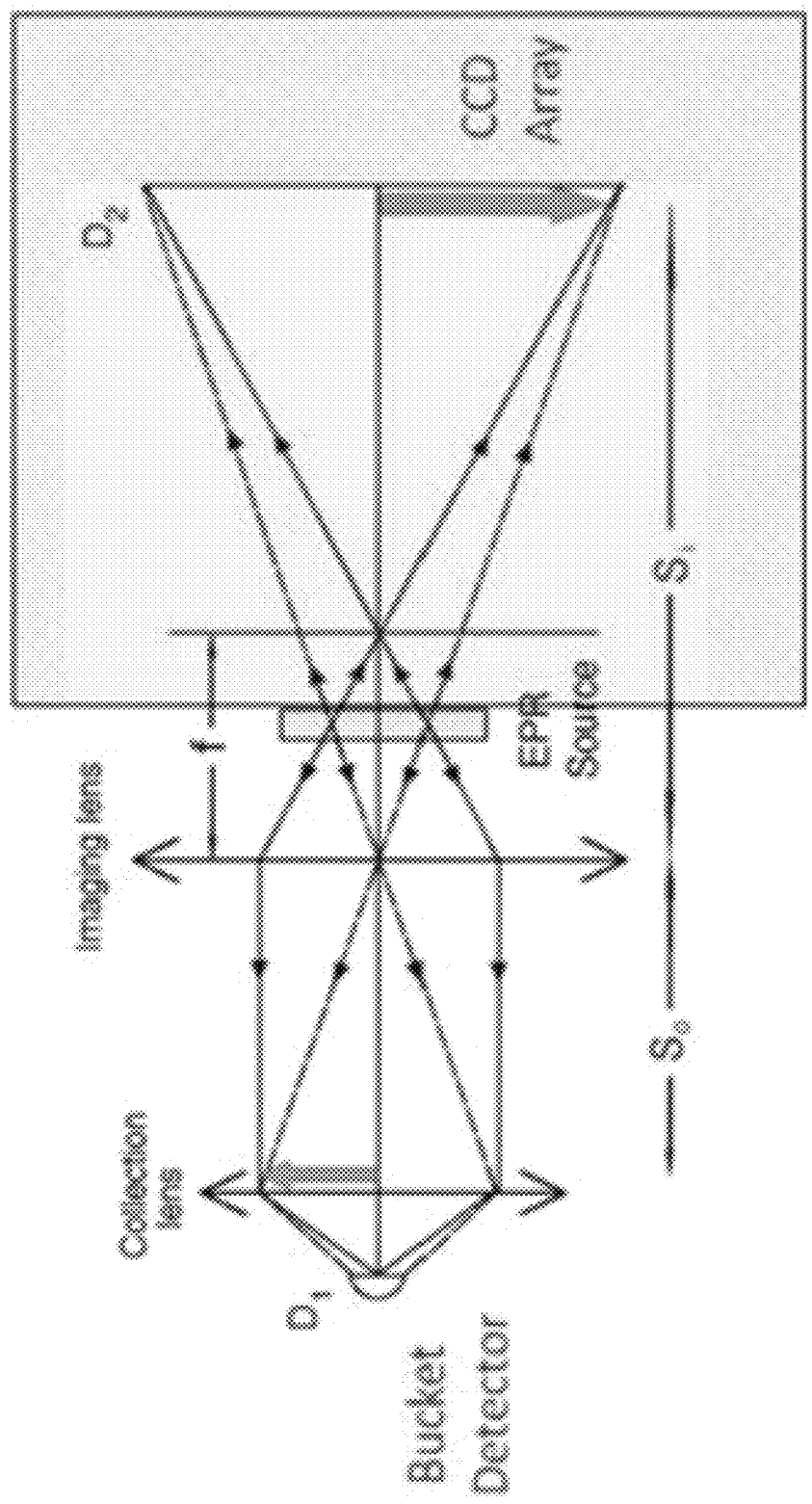
FIG. 2 is a Klyshko diagram for Type-I Ghost Imaging.
Figure 3:
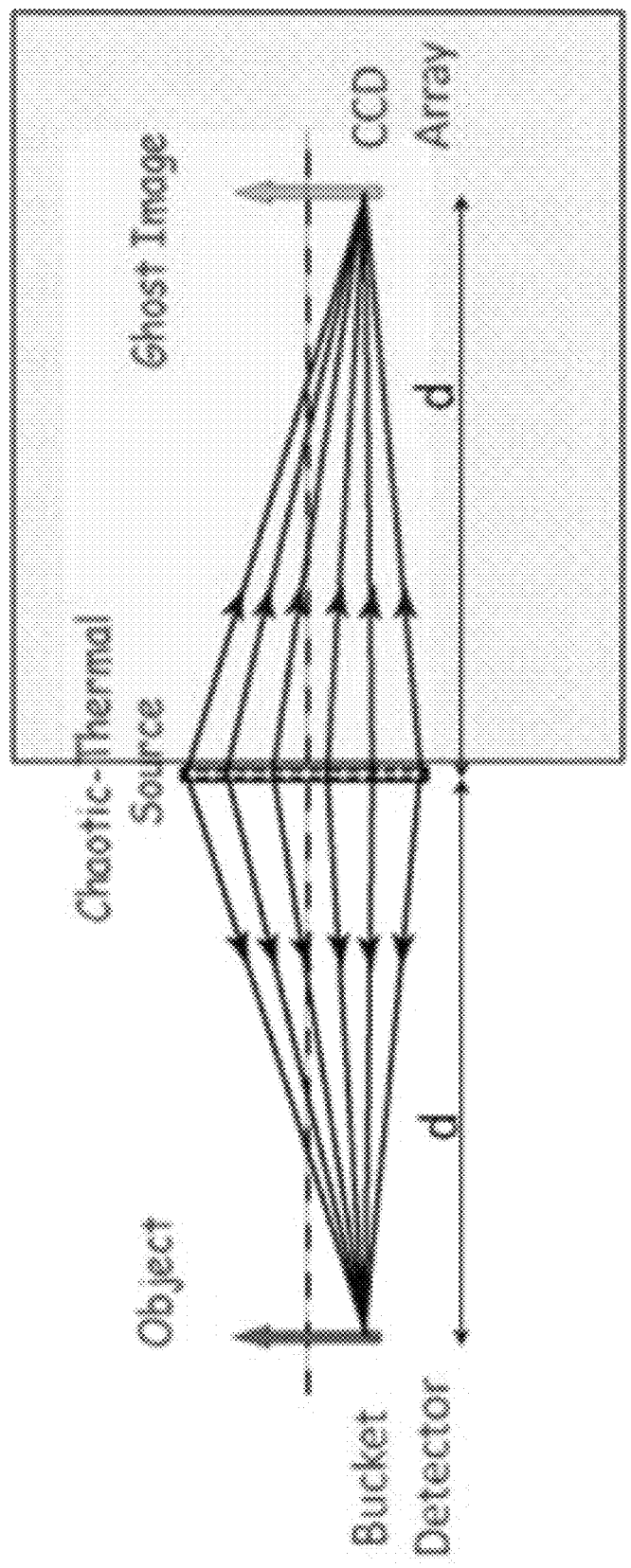
FIG. 3 is a Klyshko diagram for Type-II Ghost Imaging.
Figure 4:
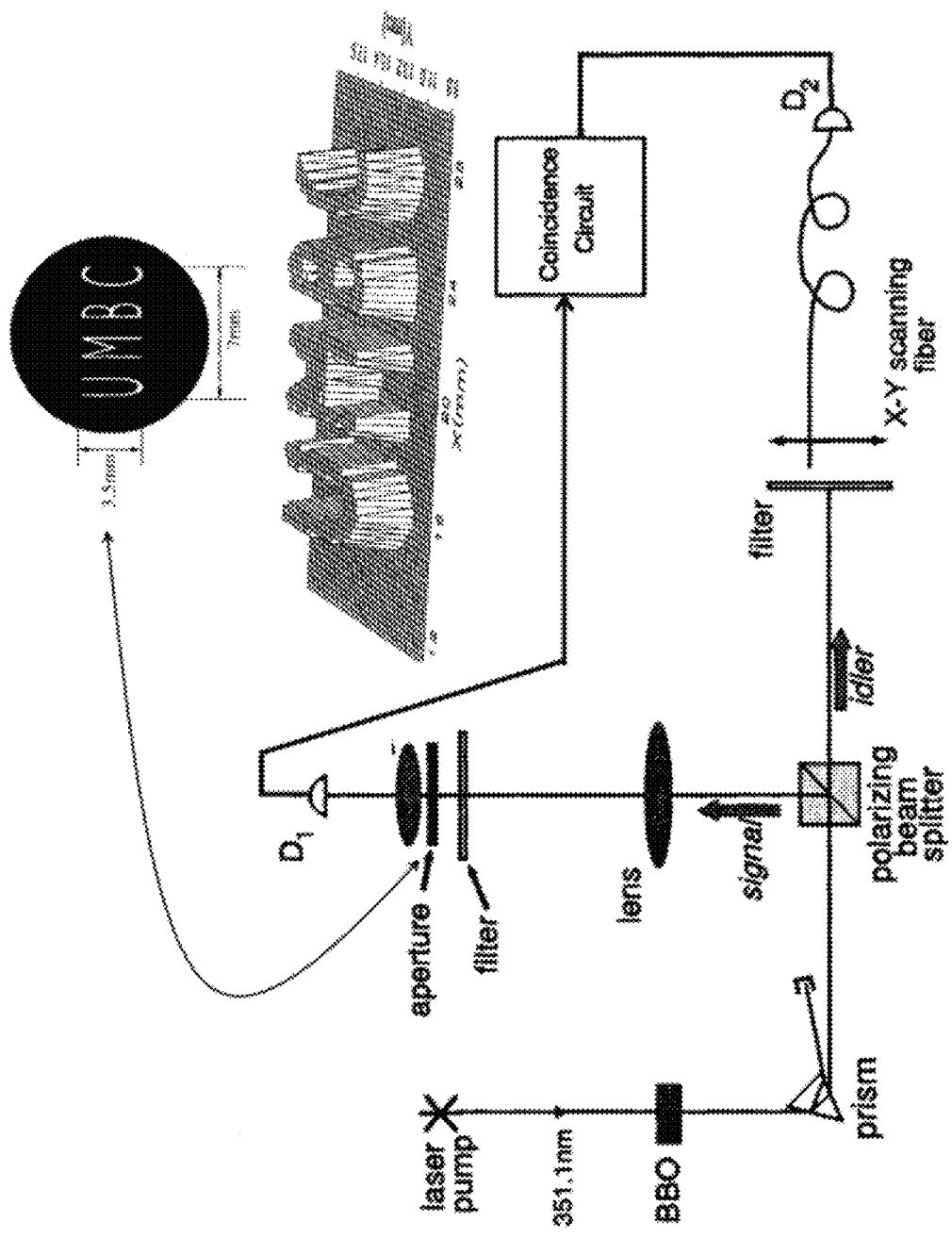
FIG. 4 is a schematic diagram of an optical device by Pittman, et al., as described in "Optical Imaging by Means of Two-photon Quantum Entanglement: Physical Review A, Vol. 52, No. 5, November 1995.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second locations, these terms are only used to distinguish one location, element, component, region, layer or section from another location, elements, component, region, layer or section. Thus, a first location, element, component, region, layer or section discussed below could be termed a second location, element, component, region, layer or section without departing from the teachings of the present invention.

As used herein the terminology target path, object path, target beam, or object beam refers to the beam or path directed to the target or object space and or area. The terminology reference path or beam relates to the photon path or beam which is detected and/or measured by the CCD, camera, etc. (e.g. element 22). The terminology is not intended to limit the scope of the invention inasmuch as other terminology could be used to similarly describe similar operating systems.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A ghost image is the result of a convolution between the aperture function (amplitude distribution function) of the object $A(\vec{\rho}_o)$ and a $\delta$-function like second-order correlation function $G^{(2)}(\vec{\rho}_o, \vec{\rho}_i)$ $$F(\vec{\rho}_i) = \int_{obj} d\vec{\rho}_o A(\vec{\rho}_o) G^{(2)}(\vec{\rho}_o, \vec{\rho}_i). \quad (1)$$

where $G^{(2)}(\vec{\rho}_o, \vec{\rho}_i) \cong \delta(\vec{\rho}_o - \vec{\rho}_i/m)$, $\vec{\rho}_o$ and $\vec{\rho}_i$ are 2D vectors of the transverse coordinate in the object plane and the image plane, respectively, and m is the magnification factor. The term $\delta$ function as used herein relates to the Dirac delta function which is a mathematical construct representing an infinitely sharp peak bounding unit area expressed as $\delta(x)$, that has the value zero everywhere except at x=0 where its value is infinitely large in such a way that its total integral is 1. The $\delta$ function characterizes the perfect point-to-point relationship between the object plane and the image plane. If the image comes with a constant background, as in this experiment, the second-order correlation function $G^{(2)}(\vec{\rho}_o, \vec{\rho}_i)$ in Eq. (1) must be composed of two parts $$G^{(2)}(\vec{\rho}_o, \vec{\rho}_i) = G_0 + \delta(\vec{\rho}_o - \vec{\rho}_i/m). \quad (2)$$

where $G_0$ is a constant. The value of $G_0$ determines the visibility of the image. One may immediately connect Eq. (2) with the $G^{(2)}$ function of thermal radiation $$G^{(2)} = G_{11}^{(1)} G_{22}^{(1)} + |G_{12}^{(1)}|^2. \quad (3)$$

where $G_{11}^{(1)} G_{22}^{(1)} \sim G_o$ is a constant, and $|G_{12}^{(1)}|^2 \sim \delta(\vec{\rho}_1 - \vec{\rho}_2)$ represents a nonlocal position-to-position correlation. Although the second-order correlation function $G^{(2)}$ is formally written in terms of $G^{(1)}$s as shown in equation (3), the physics are completely different. As we know, $G_{12}^{(1)}$ is usually measured by one photodetector representing the first-order coherence of the field, i.e., the ability of observing first-order interference. Here, in Eq. (3), $G_{12}^{(1)}$ is measured by two independent photodetectors at distant space-time points and represents a nonlocal EPR correlation.

Differing from the phenomenological classical theory of intensity-intensity correlation, the quantum theory of joint photodetection, known conventionally as Glauber's theory and published in Glauber, R. J., "The Quantum Theory of Optical Coherence," Phys. Rev. 130, 2529-2539 (1963) (hereby incorporated by reference); and Glauber, R. J. "Coherent and Incoherent States of the Radiation Field," Phys. Rev. 131, 2766 (1963) (hereby incorporated by reference) dips into the physical origin of the phenomenon. The theory gives the probability of a specified joint photodetection event $$G^{(2)} = Tr[\hat{\rho} E^{(-)}(\vec{\rho}_1) E^{(-)}(\vec{\rho}_2) E^{(+)}(\vec{\rho}_2) E^{(+)}(\vec{\rho}_1)] \quad (4)$$

and leaves room for us to identify the superposed probability amplitudes. In Eq. (4), $E^{(-)}$ and $E^{(+)}$ are the negative and positive-frequency field operators at space-time coordinates of the photodetection event and $\hat{\rho}$ represents the density operator describing the radiation. In Eq. (4), we have simplified the calculation to 2D.

In the photon counting regime, it is reasonable to model the thermal light in terms of single photon states for joint detection, $$\hat{\rho} \simeq |0\rangle\langle 0| + |\epsilon|^4 \sum_{\vec{\kappa}} \sum_{\vec{\kappa}'} \hat{a}^\dagger(\vec{\kappa}) \hat{a}^\dagger(\vec{\kappa}') |0\rangle\langle 0| \hat{a}(\vec{\kappa}') \hat{a}(\vec{\kappa}), \quad (5)$$

where $|\epsilon| \ll 1$. Basically, one models the state of thermal radiation, which results in a joint-detection event, as a statistical mixture of two photons with equal probability of having any transverse momentum $\vec{\kappa}$ and $\vec{\kappa}'$.

Assuming a large number of atoms that are ready for two-level atomic transition. At most times, the atoms are in their ground state. There is, however, a small chance for each atom to be excited to a higher energy level and later release a photon during an atomic transition from the higher energy level $E_2(\Delta E_2 \neq 0)$ back to the ground state $E_1$. It is reasonable to assume that each atomic transition excites the field into the following state:

$$|\Psi\rangle \simeq |0\rangle + \epsilon \sum_{k,s} f(k,s) \hat{a}_{k,s}^\dagger |0\rangle,$$

where $|\epsilon| \ll 1$ is the probability amplitude for the atomic transition. Within the atomic transition, $f(k, s) = \langle \psi_{k,s} | \psi \rangle$ is the probability amplitude for the radiation field to be in the single-photon state of wave number k and polarization s: $|\psi_{k,s}^\dagger\rangle = |1_{k,s}\rangle = \hat{a}_{k,s}^\dagger |0\rangle$.

For this simplified two-level system, the density matrix that characterizes the state of the radiation field excited by a large number of possible atomic transitions is thus $$\hat{\rho} = \prod_{t_{0j}} \left\{ |0\rangle + \epsilon \sum_{k,s} f(k,s) e^{-i\omega t_{0j}} \hat{a}_{k,s}^\dagger |0\rangle \right\} \times$$

$$\prod_{t_{0k}} \left\{ \langle 0| + \epsilon^* \sum_{k',s'} f(k',s') e^{i\omega' t_{0k}} \langle 0|\hat{a}_{k',s'} \right\} \simeq$$

$$\left\{ |0\rangle + \epsilon \left[ \sum_{t_{0j}} \sum_{k,s} f(k,s) e^{-i\omega t_{0j}} \hat{a}_{k,s}^\dagger |0\rangle \right] + \epsilon^2 [\ldots] \right\} + \epsilon^{*2} [\ldots] \right\}.$$

$$\times \left\{ |0\rangle + \epsilon^* \left[ \sum_{t_{0k}} \sum_{k',s'} f(k',s') e^{i\omega t_{0k}} \langle 0|\hat{a}_{k',s'} \right] \right\}$$

where $e^{-i\omega t_{0j}}$ is a random phase factor associated with the state $|\psi\rangle$ of the jth atomic transition. Summing over $t_{0j}$ and $t_{0k}$ by taking all possible values, we find the approximation to the fourth order of $|\epsilon|$, $$\hat{\rho} \simeq |0\rangle\langle 0| + |\epsilon|^2 \sum_{k,s} |f(k,s)|^2 |l_{k,s}\rangle\langle l_{k,s}| +$$

$$|\epsilon|^4 \sum_{k,s} \sum_{k',s'} |f(k,s)|^2 |f(k',s')|^2 |l_{k,s} l_{k',s'}\rangle\langle l_{k,s} l_{k',s'}|.$$

The second-order transverse spatial correlation function is thus $$G^{(2)}(\vec{\rho}_1, \vec{\rho}_2) = \sum_{\vec{\kappa}, \vec{\kappa}'} |\langle 0|E_2^{(+)}(\vec{\rho}_2) E_1^{(+)}(\vec{\rho}_1)|l_{\vec{\kappa}} l_{\vec{\kappa}'}\rangle|^2. \quad (6)$$

The electric field operator, in terms of the transverse mode and coordinates, can be written as follows:

$$E_j^{(+)}(\vec{\rho}_j) \propto \sum_{\vec{\kappa}} g_j(\vec{\kappa}; \vec{\rho}_j) \hat{a}(\vec{\kappa}), \quad (7)$$

where $\hat{a}_{\vec{\kappa}}$ is the annihilation operator for the mode corresponding to $\vec{\kappa}$ and $g_j(\vec{\rho}_j; \vec{\kappa})$ is the Green's function associated with the propagation of the field from the source to the jth detector. Substituting the field operators into Eq. (6), we obtain $$G^{(2)}(\vec{\rho}_1, \vec{\rho}_2) = \sum_{\vec{\kappa}, \vec{\kappa}'} |g_2(\vec{\kappa}; \vec{\rho}_2) g_1(\vec{\kappa}'; \vec{\rho}_1) + g_2(\vec{\kappa}'; \vec{\rho}_2) g_1(\vec{\kappa}; \vec{\rho}_1)|^2. \quad (8)$$

Eq. (8) indicates a two-photon superposition. The superposition happens between two different yet indistinguishable Feynman alternatives that lead to a joint photodetection: (1) photon $\vec{\kappa}$ and photon $\vec{\kappa}'$ are annihilated at $\vec{\rho}_2$ and $\vec{\rho}_1$, respectively, and (2) photon $\vec{\kappa}'$ and photon $\vec{\kappa}$ are annihilated at $\vec{\rho}_2$ and $\vec{\rho}_1$, respectively. The interference phenomenon is not, as in classical optics, due to the superposition of electromagnetic fields at a local point of space time. It is due to the superposition of $g_2(\vec{\kappa}; \vec{\rho}_2) g_1(\vec{\kappa}'; \vec{\rho}_1)$ and $g_2(\vec{\kappa}'; \vec{\rho}_2) g_1(\vec{\kappa}; \vec{\rho}_1)$ the so-called two-photon amplitudes.

Completing the normal square of Eq. (8), it is easy to find that the sum of the normal square terms corresponding to the constant of $G_0$ in Eq. (2):

$$\sum_{\vec{\kappa}} |g_1(\vec{\kappa}; \vec{\rho}_1)|^2 \sum_{\vec{\kappa}'} |g_2(\vec{\kappa}'; \vec{\rho}_2)|^2 = G_{11}^{(1)} G_{22}^{(1)},$$

and the cross term $$\left| \sum_{\vec{\kappa}'} g_1^*(\vec{\kappa}; \vec{\rho}_1) g_2(\vec{\kappa}'; \vec{\rho}_2) \right|^2 = |G_{12}^{(1)}(\vec{\rho}_1, \vec{\rho}_2)|^2$$

function of position-position correlation $$\left| \int d\vec{\kappa} g_1^*(\vec{\kappa}; \vec{\rho}_1) g_2(\vec{\kappa}; \vec{\rho}_2) \right|^2 \simeq |\delta(\vec{\rho}_o + \vec{\rho}_i)|^2, \quad (9)$$

where $$g_1(\vec{\kappa}; \vec{\rho}_o) \propto \Psi\left(\vec{\kappa}, -\frac{c}{\omega} d_A\right) e^{i\vec{\kappa}\cdot\vec{\rho}_o}, \quad (10)$$

$$g_2(\vec{\kappa}; \vec{\rho}_i) \propto \Psi\left(\vec{\kappa}, -\frac{c}{\omega} d_B\right) e^{i\vec{\kappa}\cdot\vec{\rho}_i},$$

are the Green's functions propagated from the radiation source to the transverse planes of $d_A$ and $d_B = d_A$. In Eq. (10), $\psi(\omega d/c)$ is a phase factor representing the optical transfer function of the linear system under the Fresnel near-field paraxial approximation, $\omega$ is the frequency of the radiation field, and c is the speed of light.

Substituting this $\delta$ function together with the constant $G_0$ into Eq. (1), an equal sized lensless image of $A(\vec{\rho}_0)$ is observed in the joint detection between the CCD array and the photon counting detector $D_1$. The visibility of the image is determined by the value of $G_0$.

The ghost images are thus successfully interpreted as the result of two-photon interference. The two-photon interference results in a point-point correlation between the object plane and the image plane and yields a ghost image of the object by means of joint photodetection.

Figure 5:
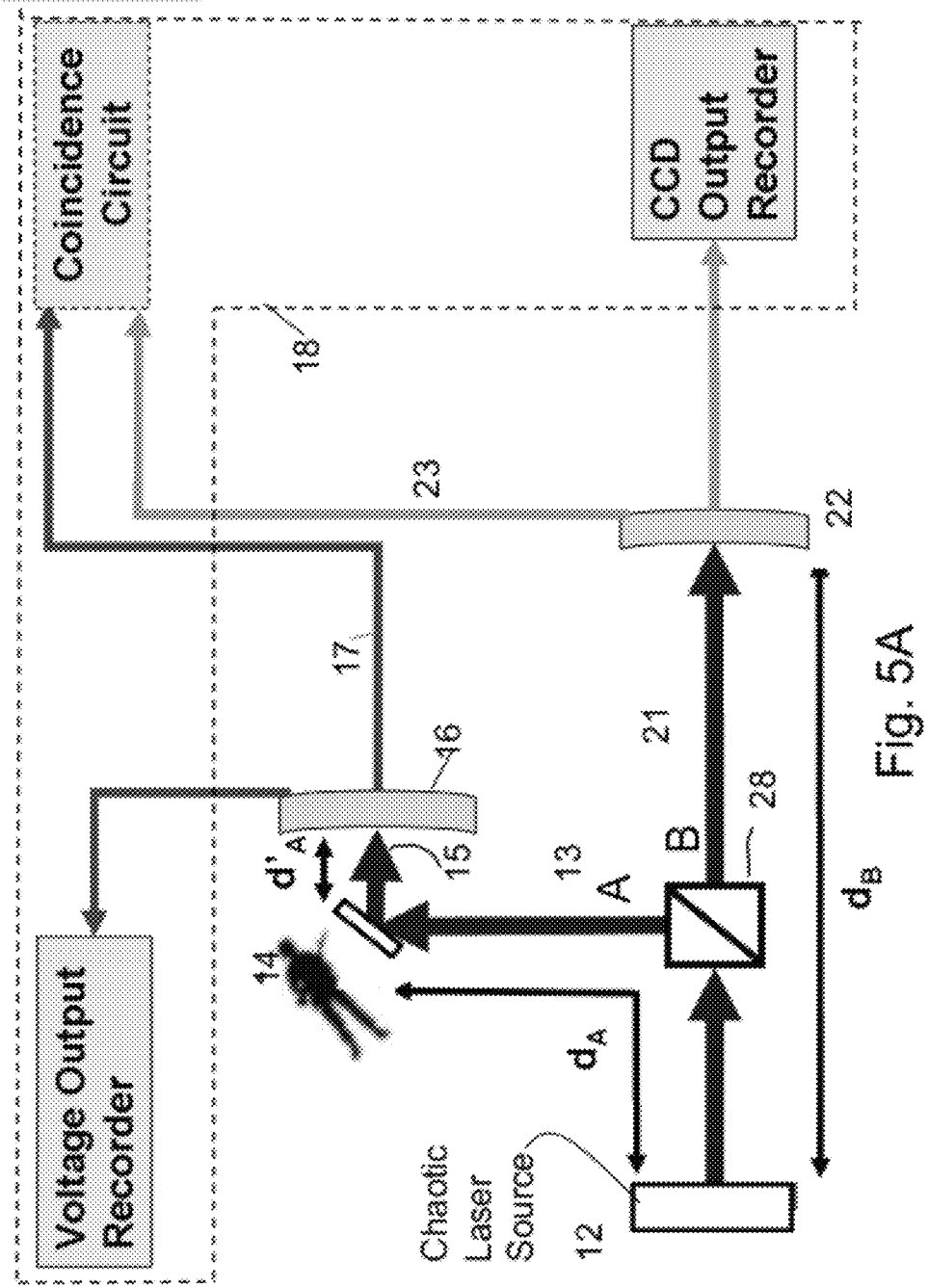
FIG. 5A is a schematic illustration of a quantum ghost imaging system comprising an arbitrary random, spatially correlated light source 12 in an air medium as the source of the illuminating light.
FIG. 5B is an illustration of the actual ghost image display on a monitor using the system of FIG. 5A.

As shown in FIG. 5A, and disclosed in more detail in U.S. Pat. No. 7,812,303, a quantum ghost imaging system comprising an arbitrary random, spatially correlated light source 12 in an air medium as the source of the illuminating light. Radiation from a chaotic pseudothermal source 12 is divided into two paths by a nonpolarizing beam splitter 28, which divides the light into paths 13 and 21. In path A, an object 14 is illuminated by the light source at a distance of $d_A$. The object 14 receives a light source output 13 and reflects light along 15. The reflected light output 15, reflected from the surface of the object, is collected by a "bucket" detector 16 and integrated for some exposure time. The bucket detector 16 is simulated by using a large area silicon photodiode for collecting the randomly scattered and reflected photons from the object 14. The integrated values of the intensity are transmitted via interconnection 17 to the two-photon correlation computation subsystem 18. In path B, a second spatially addressable detector 22 is deployed. Output 21 is collected by a spatially addressable detector 22 that is observing the source 12 for the same exposure time at 16. The detector 22 includes a two-dimensional (2D) photon counting CCD array, cooled for single-photon detection, and may optionally include a lens. A triggering pulse from a computer is used to synchronize the measurements at 16 and 22 for two-photon joint detection. The time window is preferably chosen to match the coherent time of the radiation to simplify computation. The light intensity is also preferably chosen for each element of the detector 22 working at a single-photon level within the period of detector element response time. The chaotic light 12 is simulated by transmitting a laser beam first through a lens to widen the beam and then through a phase screen made from rotating ground glass. The detector 22 is placed at any given distance $d_B$. As shown in FIG. 5A, $d_A = d_B$. It can be appreciated, however, that the present invention is operative when $d_B$ does not equal $d_A$. The detector 22 faces the light source instead of facing the object 14. The spatially addressable intensity values are transmitted via interconnection 23 to the two-photon correlation computation subsystem 18. The two-photon correlation computation subsystem 18 comprises a voltage output recorder, coincidence circuit and CDCD output recorder. Subsystem 18 computes the two-photon correlation quantum ghost image in accordance with Eq. 3 utilizing the input values from interconnections 17 and 23.

Additionally, electronic circuitry components of the computer relative to the detectors 16 and 22 comprise a coincidence circuit which provides detection coordination between detectors 16 and 22. A photon registration history for detector 16 is also provided, which provides a temporal log for the integrated values 17 transmitted to the computer 18A. The second spatially addressable detector 22 is provided with spatially addressable output that is subsequently fed to the computer and onto a display (not shown). For the optical bench schematic of FIG. 5A, the actual ghost image display on a monitor is provided in FIG. 5B and is discernable as the original toy figure. It can be appreciated that the image quality shown in FIG. 5B is improved by increasing photon flux along path 15.

Figure 6:
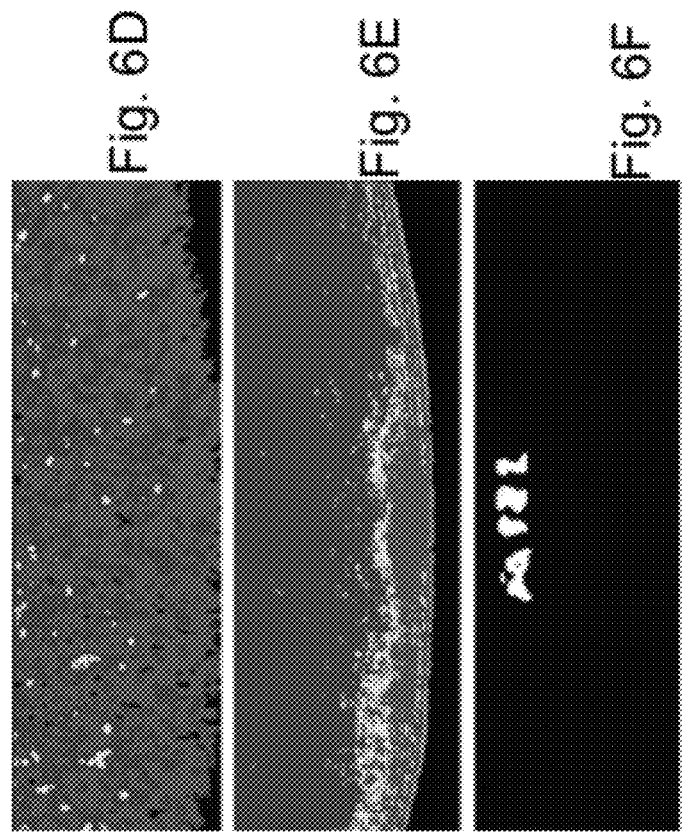
FIGS. 6A through 6F are a set of images depicting the results of a reflection ghost imaging experiment wherein the light path to the bucket detector passes through an obscuring medium. In this example the location of the obscuring medium is in the vicinity of position 15 of FIG. 5A.

To confirm the ability to generate a ghost image of an object through an obscuring medium, an obscuring medium of frosted glass is inserted along the optical path 15 of FIG. 5A. FIG. 6A is an instantaneous image of the light source 12 collected on the detector 22 (using the target ARL). FIG. 6B is an averaged image of the light source 12 obtained from detector 22 on averaging of 100 such images according to FIG. 6A. FIG. 6C is a $G^{(2)}$ image of the object obtained by correlation to photon ghost imaging from signals 17 and 23. FIG. 6D is an instantaneous image of the light source; object reflection. FIG. 6E is an averaged image of the source. FIG. 6F is the $G^{(2)}$ image of the object when the obscuring medium is absent from optical path 15. The $G^{(2)}$ image of the object is obtained by correlation to photon ghost imaging from signals produced by bucket detector 16 and imager 22. (depicted in FIG. 5A).

Figure 7:
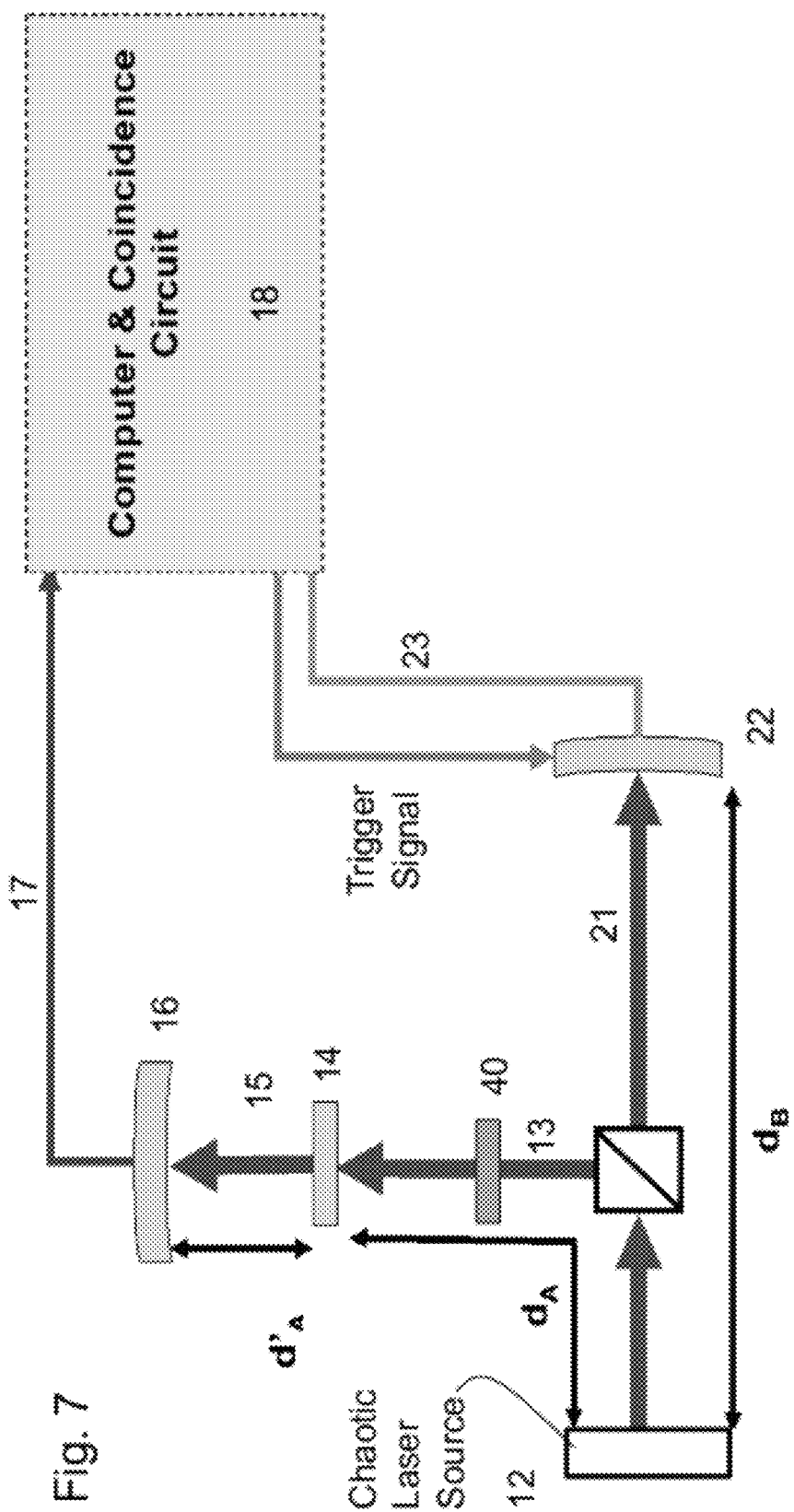
FIG. 7 is an illustrative schematic indicating that a quantum ghost image can be generated if there are phase aberrations in a path, using either transmitted or reflected photons.
Figure 8:
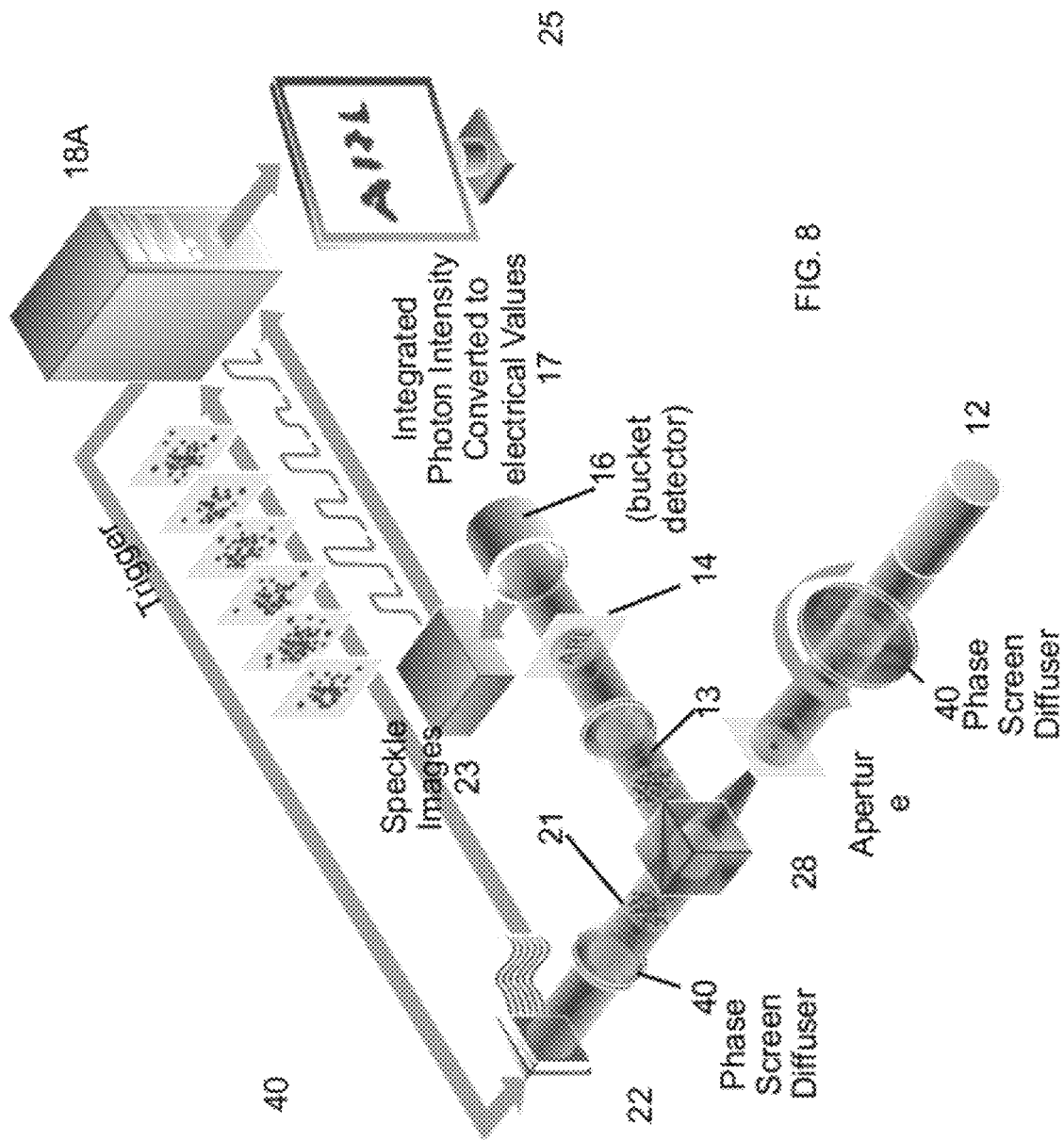
FIG. 8 is a perspective schematic view of quantum ghost imaging according to FIG. 7 with a partially transparent mask encoding the letters "ARL."

FIGS. 7 and 8 depict an inventive ghost imaging system in which the object is a semi-opaque mask 14' providing a transmissive photon output 46 to reach the bucket detector 16. In FIG. 8, the mask 14' is a stencil of the letters "ARL". The detector 22 in this regime of FIGS. 7 and 8 is a two-dimensional charge couple device array that provides two-dimensional speckle data as the spatially addressable intensity values 23 to the computer 18A with gated electrical values being communicated to the computer 18A with gated exposure start and stop triggers being communicated to the detectors 16 and 22. The object 14' is located a distance $d'_A$ from the bucket detector 16.

In accordance with a preferred embodiment, as depicted in FIG. 8, the laser source 12 in conjunction with the rotating phase screen diffuser 40, emits light uncorrelated in space and time. Thus, the speckle images 23 are random distributions in space and time. The beam splitter 28 essentially "halves" the intensity of the initial speckle image from diffuser 40 and splits it into two different paths (21 and 13) as shown in FIG.

8. Spatially correlated means that correlations are present at any given instant of time between the two paths 13, 21. There will be a point to point correlation between the speckle images on each path, although paths are spatially distinct. The coincidence detection by the processor 18 is temporal; i.e. correlated at specific time intervals. "Correlation" or "Correlated," as used in the present application, means a logical or natural association between two or more paths; i.e., an interdependence, relationship, interrelationship, correspondence, or linkage. For example, the present invention may be used in conjunction with sunlight, an incoherent light source, whereby a first and second plurality of photons are emitted from the sun at the same time. If the first detector is located on the earth (ground) receives the first plurality of photons, and the second detector located in space (such as in a satellite orbiting the earth) receives a second plurality of photons, the time intervals need to be synchronized; i.e., a first plurality of photons which strikes the ground object is correlated with a second plurality of photons detected in space at synchronized timing intervals. It can be readily appreciated by those skilled in the art that if the detected samples from the first and second plurality of photons are not part of the correlation, it will not contribute to the $G^{(2)}$ image as mathematically described in the above equations. Further, coincidence has to do with two measurements at the same or approximately the same time. For example, when a coincidence occurs, one must compensate for the media involved to take into account the variation in particle velocity between different media.

In FIG. 8, the mask 14' is a stencil of the letters "ARL". The detector 22 in this regime of FIGS. 7 and 8 is a two-dimensional charge couple device array that provides two-dimensional speckle data as the spatially addressable intensity values 23 to the computer 18A with gated electrical values being communicated to the computer 18A with gated exposure start and stop triggers being communicated to the detectors 16 and 22. The object 14' is located a distance $d'_A$ from the bucket detector 16.

In accordance with the embodiment depicted in FIG. 8, the laser source 12 in conjunction with the rotating phase screen diffuser 40, emits light uncorrelated in space and time. Thus, the speckle images 23 are random distributions in space and time. The beam splitter 28 essentially "halves" the intensity of the initial speckle image from diffuser 40 and splits it into two different paths (21 and 13) as shown in FIG. 8. Spatially correlated means that correlations are present at any given instant of time between the two paths 13, 21. There will be a point to point correlation between the speckle images on each path, although paths are spatially distinct. The coincidence detection by the processor 18 is temporal; i.e. correlated at specific time intervals. "Correlation" or "Correlated," as used in the present application, means a logical or natural association between two or more paths; i.e., an interdependence, relationship, interrelationship, correspondence, or linkage. For example, the present invention may be used in conjunction with sunlight, an incoherent light source, whereby a first and second plurality of photons are emitted from the sun at the same time. If the first detector is located on the earth (ground) receives the first plurality of photons, and the second detector located in space (such as in a satellite orbiting the earth) receives a second plurality of photons, the time intervals need to be synchronized; i.e., a first plurality of photons which strikes the ground object is correlated with a second plurality of photons detected in space at synchronized timing intervals. It can be readily appreciated by those skilled in the art that if the detected samples from the first and second plurality of photons are not part of the correlation, it will not contribute to the $G^{(2)}$ image as mathematically described in the above equations. Further, coincidence has to do with two measurements at the same or approximately the same time. For example, when a coincidence occurs, one must compensate for the media involved to take into account the variation in particle velocity between different media.

Figure 9:
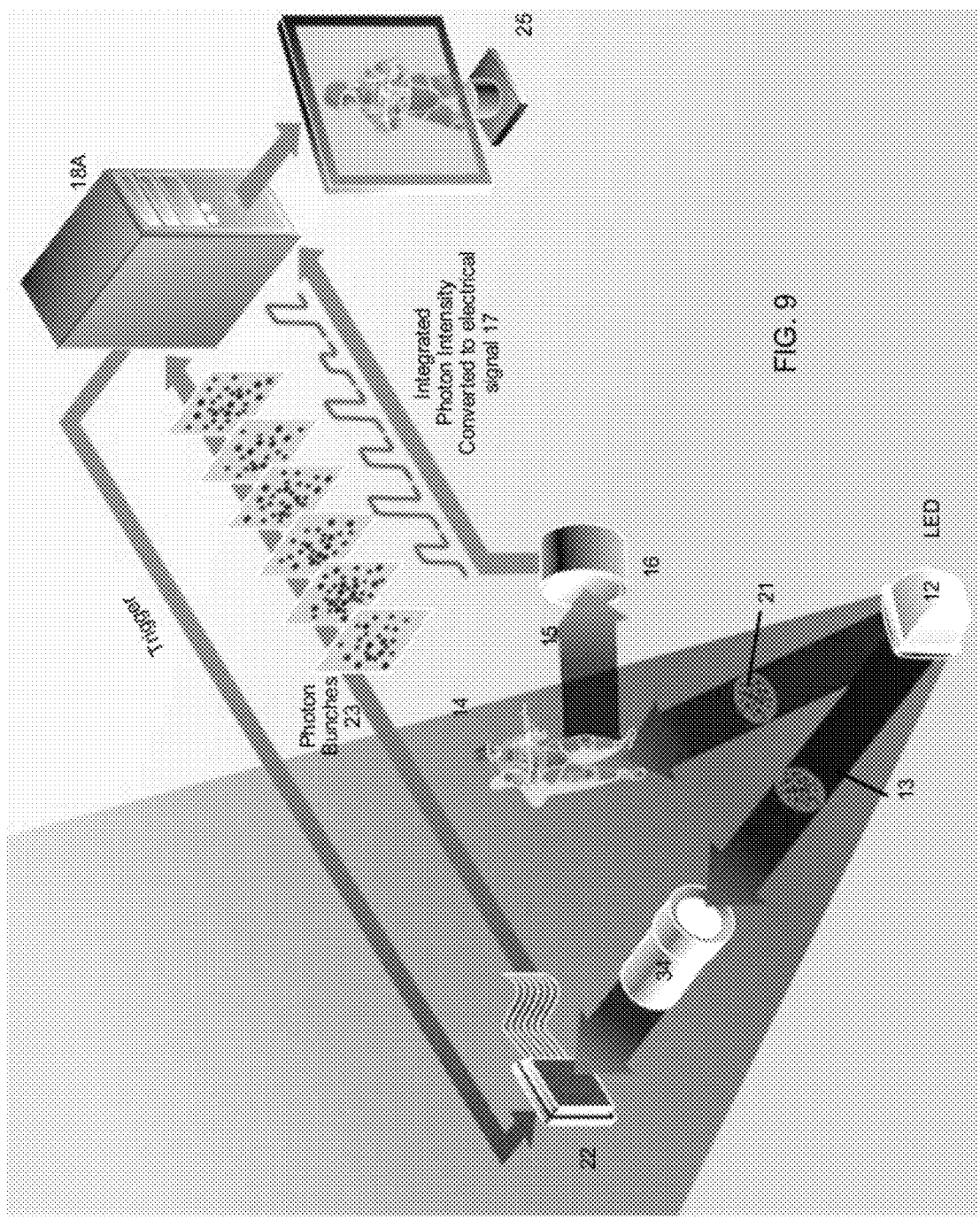
FIG. 9 is a perspective schematic view of quantum ghost imaging generated with a correlated photons of a light emitting diode (LED) incoherent light source.

FIG. 9 is a perspective schematic of a reflective ghost imaging scheme according to the present invention using light emitting diodes as a representative incoherent light source in a field setting and insensitive to transmission through obscuring medium. Similarly, solar radiation as a light source, as described in further detail in U.S. Pat. No. 7,812,303, hereby incorporated by reference.

A preferred embodiment of the present invention may utilize a light source emitting radiation that is one of an entangled, thermal, or chaotic light source. The photons from the light source may be divided into two paths: one path for the object to be imaged, and the other path in which images of the entangled, thermal, or chaotic light are measured independent of interaction with the objects. Any or all paths may pass through an obscuring medium. The measurements of the entangled, thermal, or chaotic light may then stored for future processing. In U.S. Pat. No. 7,812,303, the light in the object path is collected into a bucket detector and measured. The measurements of the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image.

Non-Line-of-Sight-Ghost-Imaging

Figure 10:
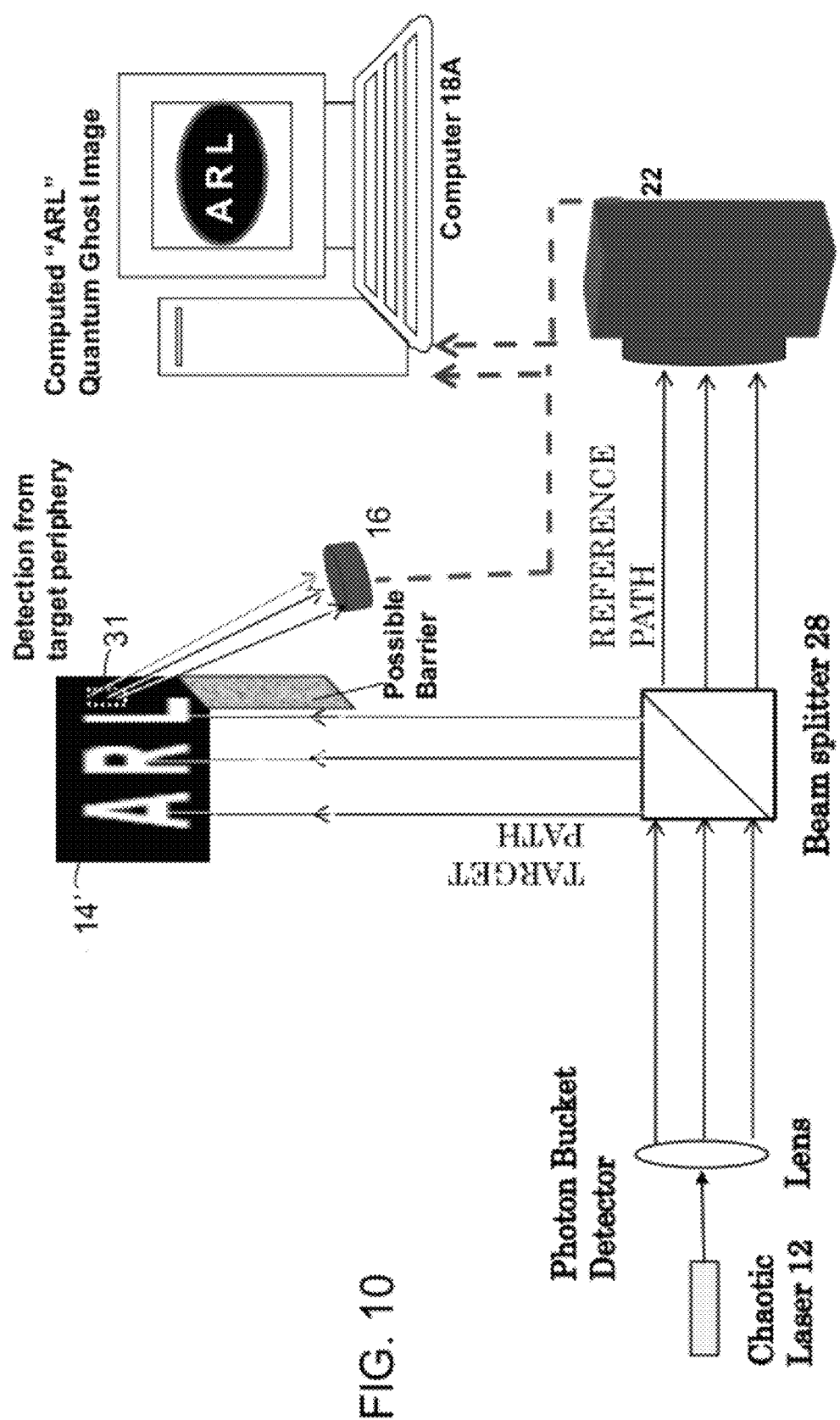
FIG. 10 is schematic depiction of an experimental set-up for quantum imaging "absent-line-of-sight."
Figure 12:
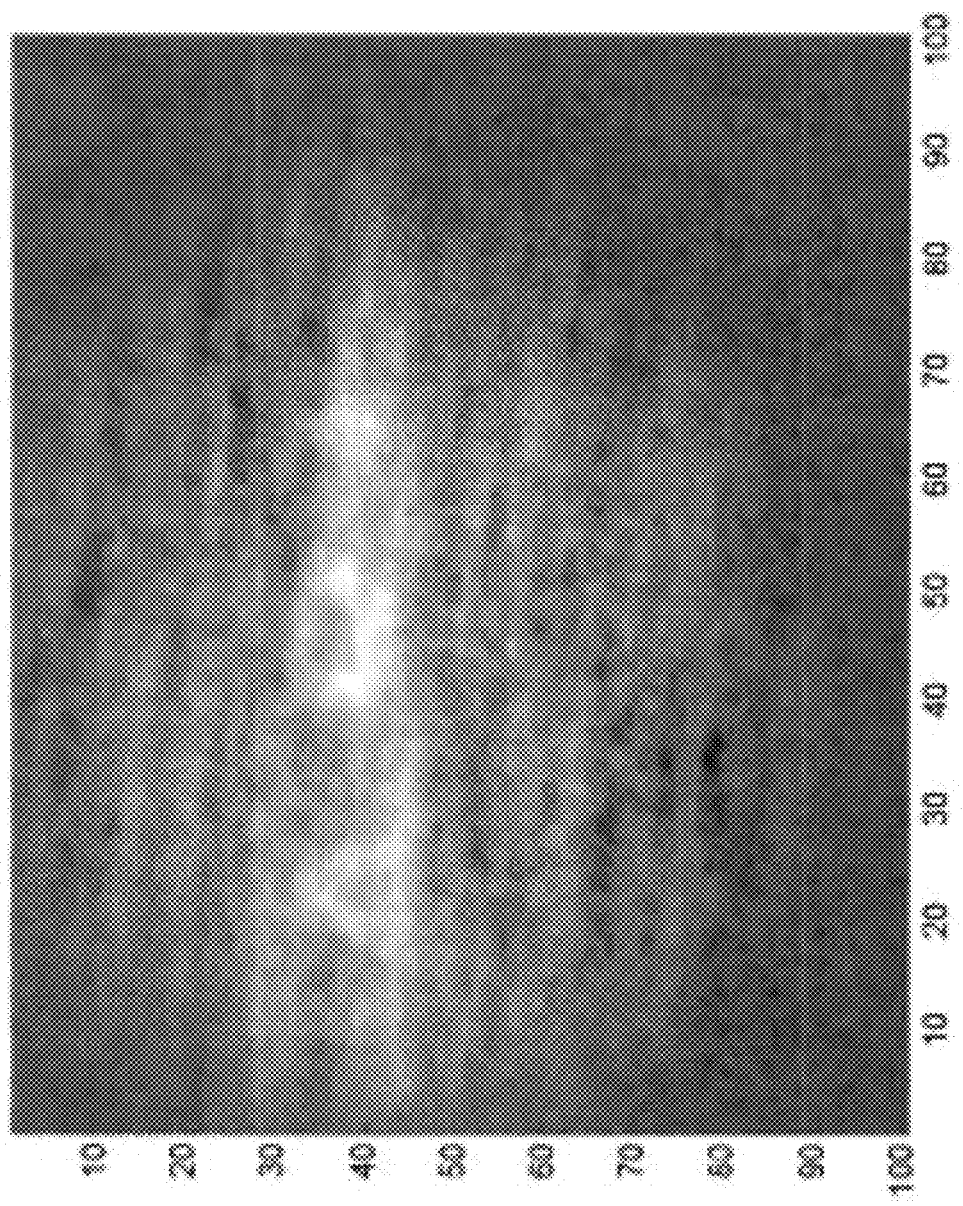
FIG. 12 is an illustration of a ghost image computed using only the per frame photon counts integrated insider of the white box 31 (shown in FIGS. 10 and 11) using 10,000 frames and the $G^{(2)}$ ghost image was computed using compressive imaging methods.

FIG. 10 is schematic depiction of an experimental set-up for quantum imaging "absent-line-of-sight," including photon probability paths from the illuminated target. During this experiment, only the photons that were measured in the white outlined area 31 were used. The white outlined area contained no spatial patterns about the "ARL" target because only photon counts were measured by a non-resolving single pixel bucket detector 16. The "ARL was not in the line-of-sight of the bucket detector 16. The photon counts inside the white outlined area 31 were used as the "bucket" measurements. Computing the $G^{(2)}$ correlations using the bucket measurements and the coincidentally measured reference frames produced the Ghost image of ARL in FIG. 12. This experiment was conducted under conditions of extreme turbulence in all of the paths for both the reference and the target (as shown in FIG. 10). However, the technique can be utilized with or without turbulence. Compressive Imaging (CI) methods were used to compute the $G^{(2)}$ ghost image; however, similar images could be produced using direct Glauber $G^{(2)}$ computations. As explained in detail above, the $G^{(2)}$ image of the object is obtained by correlation to photon ghost imaging from signals produced by bucket detector 16 and imager 22. The imager 22 may be a CCD, digital camera, video camera, scanner, or the like. Similarly, the detector 16 may comprise a bucket detector or CCD, digital camera, video camera, scanner, or the like which is configured to count photons (i.e., record energy imparted by photons). The two-photon correlation computation subsystem 18 comprises a voltage output recorder, coincidence circuit and CDCD output recorder. Subsystem 18 computes the two-photon correlation quantum ghost image in accordance with Eq. 3 utilizing the input values from elements 16 and 22.

In the preferred embodiment depicted schematically in FIG. 10, a "Ghost Image" an object is obtained that is not in the direct line of sight or field of view of the viewer, which may be for example, a bucket detector 16. When a bucket detector is aimed nearby the object at location 31, then a "Ghost Image" of part or the entirety of the object is generated, even in the presence of turbulence which might otherwise be disruptive to image generation. Scattering of quantum particles such as photons off the object, such as the location depicted in the oval 31, carries information of the object shape even when the quantum particles such as photons of light do not go directly to the bucket detector 16. The bucket detector 16 picks up quantum information on the object shape and its temporal relations to separate reference fields. The reference fields are recorded by an imager 22 (CCD, or camera, etc.) that looks at the light source 12 but not the object. FIG. 13 is the result of ensemble integration of all the reference field measurements for 10,000 frames. The embodiment of FIG. 10 comprises the computer 18A which functions in a manner described with respect to FIG. 8 above. However, in FIG. 8 the target 14 is a mask. In the embodiment of FIG. 10, the target 14' appears on a piece of paper on which the letters ARL are printed. The paper was approximately 1.7 m from the detector 16.

Figure 11:
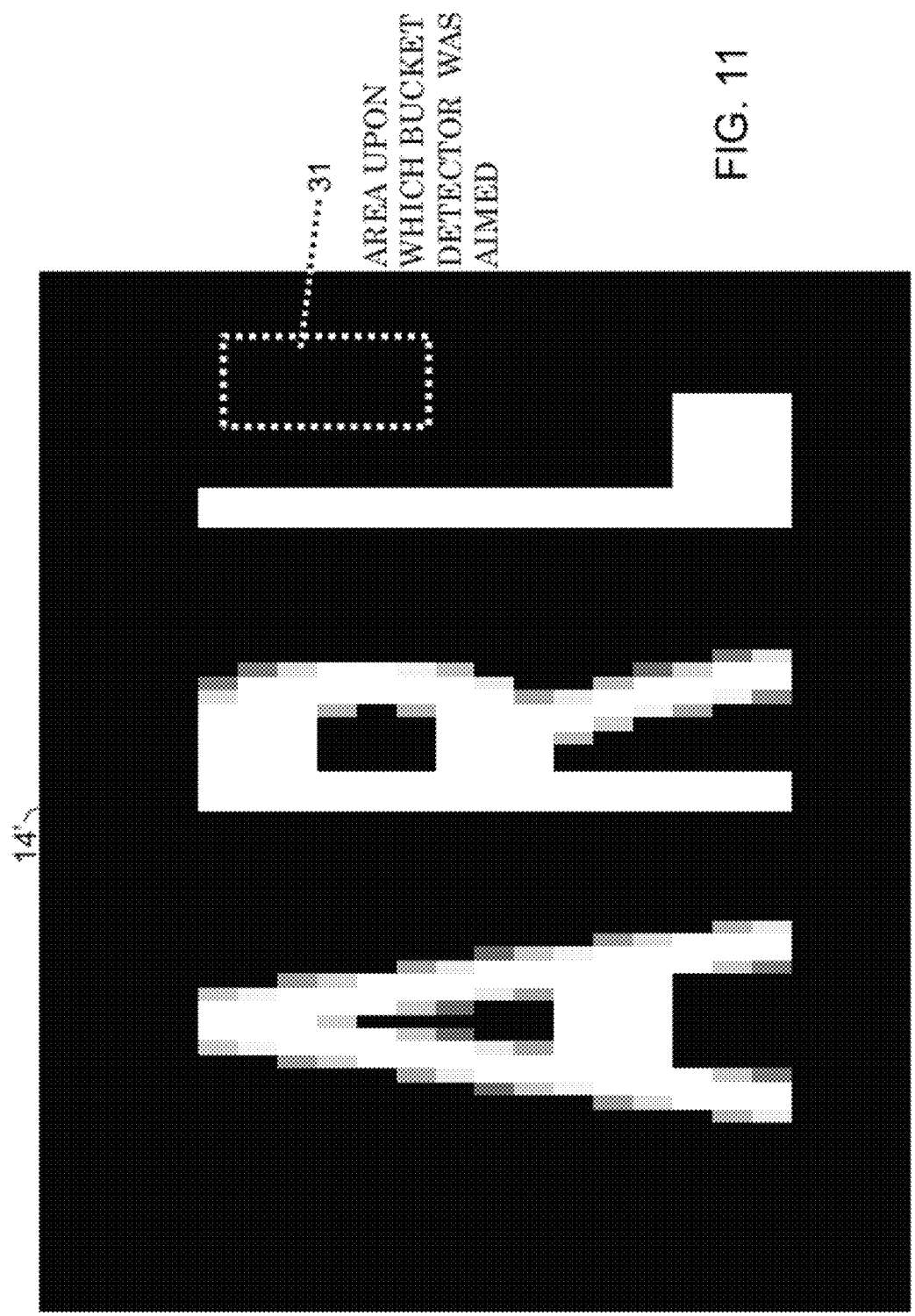
FIG. 11 is an illustration of an "ARL" target of FIG. 10 printed in white and illustrating the approximate location 31 where the bucket detector 16 was aimed.

FIG. 11 is a low resolution average image "ARL" bucket target area for 10,000 frames. The non-line-of-sight "bucketing" area 31 was located within the box outlined in white. All of the frames were imaged through high levels of turbulence. As depicted in FIG. 11, the invention was observed to work even when the bucket detector 16 was aimed at a region to the side of the ARL (shown as area 31 in FIG. 11) that was coplanar with the object, i.e., the ARL appeared on a piece of paper and the bucket detector was directed to the paper at the location labeled 31 in FIG. 11.

In connection with FIG. 11, the ARL target was produced using a 10 point bold Arial font colored white, with black background, actual printed size. The ARL target was printed in white using an Arial 10 point font bold capital letters. To obtain a perspective as to scale, given that a single font is 0.3527 mm, the height was approximately 3.527 mm. The measured distance from the beginning of the A to the end of the letter "L" is approximately 9 mm. The width of the rectangle 31 was approximately 1.25 mm and the height was approximately 1.75 mm. The rectangle 31 was approximately 2 mm from the upright portion of the "L."

The paper 14' in FIG. 11 is translucent with an approximate weight of 20 pounds per 500 basis ream with a brightness value of 92 on a TAPPI Brightness scale of 1 to 100. The paper in FIG. 11 was mounted on white cardboard backing. The paper 14' was semi-shiny to visible light laser illumination and had a thickness of 0.097 mm.

Translucent objects allow the light to enter the material, where it is scattered around in a manner that depends on the physical properties of the material like the absorption coefficient (a) and the scattering coefficient (s), as described further in "Acquisition of Subsurface Scattering Objects," a Diploma Thesis by Christian Fuchs, Max-Planck-Institut für Informatik, Saarbrücken, Germany (date appearing on thesis is Feb. 9, 2006). Accordingly light may enter the material for subsurface scattering, including single scattering as described further in "Acquisition of Subsurface Scattering Objects," hereby incorporated by reference. Moreover, concepts relating to a general bidirectional surface scattering distribution function (BSSRDF), relating to light transport, is described further in "A Practical Model for Subsurface Light Transport," hereby incorporated by reference.

The image of ARL, like any other object, may be generated even in the presence of turbulence which might otherwise be disruptive to image generation. A description of the effect of turbulence and compression of images may be found in Meyers, et al, "Ghost Imaging Experiments at ARL," Quantum Communications and Quantum Imaging VIII, Proc. Of SPIE Vol. 7815, 781501 (2010), and R. Meyers, K. Deacon, and Y. Shih, "Turbulence-free ghost imaging," App. Phys. Lett, 98, 111115 (2011), both of which are hereby incorporated by reference. Scattering of quantum particles such as photons off the object (in this case "ARL") carries information of the object shape even when the quantum particles such as photons of light do not go directly to the bucket detector 16. The bucket detector 16 picks up quantum information on the object shape and its temporal relations to separate reference fields. The reference fields are recorded by an imager 22 (CCD, or camera, etc.) that looks at the light source but not the object. The preferred embodiment depicted in FIG. 10 was observed to work when the bucket detector was aimed at the region 31 in FIG. 11, which is to the side of the object (ARL) that was coplanar with the object (ARL).

It is noted that where the bucket detector 16 is referenced herein, a camera may be used the output of which can be converted to nonspatial output in a manner similar to a bucket detector without departing from the scope of the present invention.

When a detector 16 is aimed nearby the object but not at the object then a Ghost Image of part or the entirety of the object is generated. The object is generated even in the presence of turbulence which might otherwise be disruptive to image generation. Scattering of quantum particles such as photons off the object carries information of the object shape even when the quantum particles such as photons of light do not go directly to the bucket detector. The detector 16 picks up quantum information on the object shape and its temporal relations to separately referenced fields are recorded by an imager 22 (CCD, or camera, etc.) that "looks" at the light source but not the object. The invention was observed to work even when the bucket detector was aimed at a region to the side of the object that was coplanar with the object.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The preferred embodiments of the present invention may be used for active and passive illumination and determination of 3D structure from single views to mitigate enemy cover, concealment, and camouflage. Further potential applications include persistent surveillance applications, stealthier, and more robust situational awareness for urban warfare, UAV and robotic surveillance, persistent surveillance, and IED surveillance. Improved medical imaging will result since bone will be less effective in shielding soft tissue from imaging detectors.

As used herein the terminology processor includes a computer, microprocessor, multiprocessor, central processing unit, CPU, controller, mainframe, signal processing circuitry, or a plurality of computers, processors, microprocessors, multiprocessors, controller, CPUs, or mainframes or combinations thereof and/or equivalents thereof.

As used herein, the terminology "object" may include visual information, an image, printed matter, subject, a plurality of objects, material, surface, wall, poster, paper, picture, or anything similar.

As used herein the terminology "diffuse reflection" means reflection of light, sound, or radio waves from a surface in all directions. Diffuse reflection is the reflection of light from a surface such that an incident ray is reflected at many different angles, rather than at one precise angle, as is the case for specular reflection. If a surface is completely nonspecular, the reflected light will be evenly spread over the hemisphere surrounding the surface ($2\times\pi$ steradians).

As used herein the terminology "CCD" means charge-coupled device, a high-speed semiconductor used chiefly in image detection. Digital cameras, video cameras, and optical scanners all use CCD arrays.

As used herein the terminology "nonspatial photon detector" means a detector (such as a bucket detector) of photons that has no spatial resolution.

As used herein the terminology "spatial light detector" or "spatial receiver" means a detector or receiver capable of resolving spatial information from the light or quantum particles received.

Although various preferred embodiments of the present invention have been described herein in detail to provide for complete and clear disclosure, it will be appreciated by those skilled in the art that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A method for obtaining an image of an object out of line of sight comprising:
   directing a chaotic light beam at a first area containing the object;
   measuring the light from the chaotic light beam at a plurality of instances in time;
   using a photon detector, detecting light from a second area over a plurality of instances in time; the photon detector not being in the line of sight with the first area but in line-of-sight with a second area;
   using a processor, correlating the information received by the photon detector with the measurement of light from the chaotic light beam at specific instances in time; and
   producing an image of the object.

2. The method of claim 1 wherein the first and second areas are coplanar and located on a translucent material, and wherein light from the first area is reflected and scattered through the translucent material to the second area and is collected by the photon detector from light from the second area, and wherein the correlating of the information is based upon quantum wave function probability amplitudes.

3. The method of claim 1 wherein the step of directing a chaotic light beam at a first area comprises illuminating the first area with light from a chaotic laser and further comprising measuring light from the chaotic laser using a spatial light detector, detecting coincidences between light reflected from the second area and detected by the photon detector with light detected by the spatial light detector using at least one processor, and forming an image of the visual information contained in the first area using the at least one processor.

4. The method of claim 3 wherein the object is visual information and the step of directing a chaotic light beam at a first area comprises directing light from the chaotic laser into a beam splitter whereby the beam from the chaotic laser is split into a first beam which irradiates the first area and a second beam which is measured by the spatial light detector, the output of the spatial light detector being operatively connected to the at least one processor, the output of the photon detector being operatively connected to the at least one processor, the at least one processor operating to detect coincidences between the outputs of the spatial light detector and the photon detector, the at least one processor operating to form an image of the visual information contained in the first area.

5. The method of claim 1 wherein the chaotic light beam is directed through turbulence.

6. The method of claim 1 wherein the measuring of the light from the chaotic light beam at a plurality of instances in time is performed using a charge-coupled device.

7. A system for imaging information comprising;
   a spatial receiver,
   a chaotic photon light source for producing light; the light comprising a first beam adapted to be directed at a first predetermined area containing an object, and a second beam which is received by the spatial receiver and measured at specific intervals in time;
   at least one processor operatively connected to the spatial receiver, the spatial receiver operating to transmit spatial information correlated to specific intervals of time to the processor;
   a first receiver operatively connected to the at least one processor and operative to detect the influence of the object on the first portion of the light beam; the first receiver not being in the line of sight with the first predetermined area and adapted to detect light from a second predetermined area spaced from and coplanar with the first predetermined area, and
   the at least one processor operating to correlate the outputs of the first receiver with spatial information derived from the spatial receiver at correlating intervals of time to create an image of the object.

8. The system of claim 7 further comprising a beams splitter, the light from the chaotic photon light source being divided into the first and second beams by the beam splitter, the first beam being directed in a first direction towards the first predetermined area such that at least a portion of the first part is influenced by the object present at the first predetermined area and detected by the first detector by viewing light from a second predetermined area, the second beam being directed in a second direction absent the object and detected by the spatial receiver.

9. The system of claim 7 wherein the spatial receiver is a charge-coupled device and wherein the first receiver is a nonspatial photon detector.

10. The system of claim 7 wherein the chaotic light source comprises modulated light.

11. The system of claim 10 wherein the modulated light is modulated by a thermalizing element.

12. The system of claim 7 wherein the chaotic photon light source is directed into a beam splitter which splits the light into a first beam which irradiates the first predetermined area and a second beam which is measured by the spatial light detector, the at least one processor operating to detect coincidences between the outputs of the spatial light detector and the first receiver, the at least one processor operating to form an image of the second predetermined area, the image of the second predetermined area containing the visual information found at the first area the at least one processor operating to form an image of the object contained in the first predetermined area.

13. The system of claim 12 wherein the object comprises visual information imprinted on translucent material, and wherein the second predetermined area is located on the translucent material, and wherein the visual information is transferred from the first predetermined area to the second predetermined area at least in part through the translucent material.

14. A method of imaging an object in a first area from a predetermined location not in the light of sight with the object comprising:

providing a beam of photons, at least a portion of the beam of photons being directed at a first area;

measuring the light from the beam of photons at a plurality of instances in time using a spatial receiver;

detecting light influenced by the object in the first area using a first detector at a predetermined location not in line of sight with the first area; the first detector being directed to a second area spaced from the first area, and producing an image of the object by correlating the outputs of the first detector and the spatial receiver using at least one processor.

15. The method of claim 14, further comprising passing the beam of photons through a thermalized light source.

16. The method of claim 14, further comprising passing the generated beam of photons through a spatial light modulator.

17. The method of claim 14 further comprising modulating the beam of photons using a modulator, the modulator being operatively connected to the at least one processor which monitors or records the modulation of the beam of photons, whereupon the processor determines image information based upon the output of the modulator and the outputs of the first detector and spatial receiver.

18. The method of claim 14 wherein the beam of photons is a chaotic light beam that is directed through turbulence.

19. The method of claim 18 wherein the measuring of the light from the chaotic light beam at a plurality of instances in time is performed using a charge-coupled device.

* * * * *